United States Patent Office 3,543,077
Patented Nov. 24, 1970

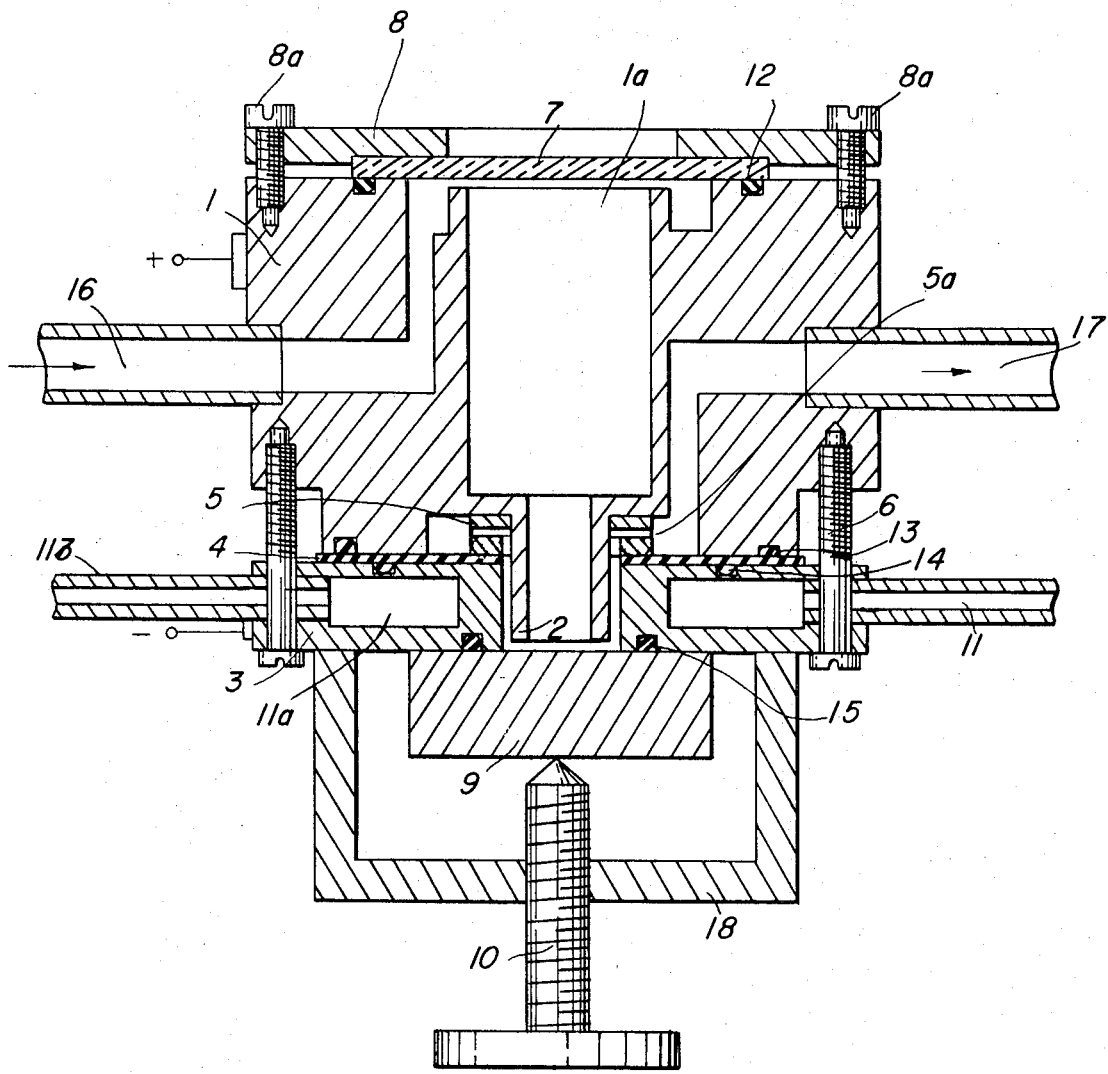

3,543,077
GLOW DISCHARGE TUBE FOR SPECTRAL
ANALYSIS
Werner Grimm, Grossauheim, Germany, assignor to RSV
Prazisionsmessgerate G.m.b.H., Hechendorf (Pilsensee),
Germany, a corporation of Germany
Filed June 7, 1968, Ser. No. 735,304
Claims priority, application Germany, June 10, 1967,
V 33,821
Int. Cl. G01j 3/12; H01j 17/04, 17/26
U.S. Cl. 313—210
9 Claims

ABSTRACT OF THE DISCLOSURE

A glow discharge tube for qualitative and quantitative spectral analysis, in which a hollow anode body has a nipple concentrically surrounded with clearance by an annular cathode body and urged against the upper face of the latter by a ring placed on said nipple, which ring has a number of radial bores therein. The lower end of the nipple is slightly spaced from the upper face of a test body or sample to be analyzed, which sample is pressed by a screw against the lower face of said annular cathode body.

---

The invention relates to a glow discharge tube for qualitative and quantitative spectral analysis.

It is the object of the glow discharge tube according to the invention, to analyze substances, particularly substances present in small quantity, with a saving of time and with great accuracy. The requirement of determining rapidly and without great amount of work the constituents of a substance as well as their concentration with a low margin of error in small quantities of substances, arises for example during the supervision of production and the routine control of material.

For problems of this type, there is used today to a considerable extent the optical spectral analysis, whereby most frequensy the electric glow-discharge and the spark-discharge is utilized as a source of light. It was found to be disadvantageous in this analysis method, however, that the physical conditions could be grasped only with difficulty and are unsatisfactorily reproducible, which conditions prevail during the electric discharge on the surface of the substance to be examined and in the plasma. Thus, in the analysis of solid bodies, both the arc-discharge as well as the spark discharge leads to a local melting of the surface of the sample and thereupon to the more or less great partial evaporation of the individual components; furthermore, in both types of discharge, occurs the self-reversal of predetermined spectral lines. For these reasons, the relative error is compartively great in the quantitative spectral analysis; the error amounts to approximately 3% and as a result thereof, for example, upon the analysis of metals and alloys, there is quantitatively examined as a rule with the customary spectral analytic methods, solely a range of concentration limited to a content of up to about 10%.

One way of avoiding the mentioned disadvantages is offered by the cathodic evaporation or disintegration in an electric gas discharge tube of suitable construction. In the special case of a hollow cathode discharge tube, such glow discharge tubes have been used for some time for hyper-fine structure-examinations. (See H. Schüler and H. Gollnow: "High Intensity Glow Discharge Tube for the Spectro-Scopic Examination of Small Quantities of Substance." Zeitschrift für Physik, vol. 93, year 1935, pages 611 to 619—H. Schüler and A. Michel: Concerning Two New Hollow Cathode Discharge Tubes. Spectrochimica Acta, vol. 5, year 1952, pages 322 to 326), as they disclose a source of light which with sufficient light intensity requires only small quantities of substances. It is furthermore already known to utilize hollow cathode discharge tubes for the qualitative and quantitative spectrochemical analysis (see F. T. Birks: The Application of the Hollow Source to Spectrographic Analysis. Spectrochimica Acta, vol. 6, year 1954, pages 169 to 179. H. Falk: Spectroanalysis of Glass on Halogens and Arsene With Hollow Cathode Discharge. Spectrochimica Acta, vol. 21 pages 423 to 426).

In the types of construction of the hollow cathode tubes known previously (see Zeitschrift fur Physik, vol. 93, year 1935, pages 611 to 619; Spectrochimica Acta, vol. 5, year 1952, pages 322 to 326; Spectrochimica Acta, vol. 6, year 1954, pages 169 to 179; Spectrochimica Acta, vol. 21, year 1965, pages 423 to 426), either the material to be analyzed in form of powder or chips is brought into the bore of the cathode or the hollow cathode vessel is itself produced out of the material to be examined. In the first named case, the test piece under unfavorable heat conduction conditions, may melt, and then its constituents evaporate to a more or less differentiating degree. The advantage of the flow discharge, namely, the continuous disintegration of the substance to be analyzed by means of atomization, in this way accordingly is again lost. If on the other hand, the hollow cathode is made of the material to be examined, then, particularly if brittle material in a cup-shaped form is to be examined, appreciable difficulties of technological nature may occur during the shaping process. In this case, the preparation of the test-piece always will require a very high expenditure of work and time. This embodiment of the hollow cathode is therefore not adapted to routine analysis, as they are for example necessary in the supervision of production and the control of material.

With a device not yet pertaining to the state of the prior art (see German patent application No. V 30,644 (IXb/421): Device for the Analysis of Solids), it is possible to analyze small test-pieces having a plane or almost plane surface, namely, without additional shaping or molding operations. The device is characterized by the fact that a cathode tube made of material which is disintegratable with difficulty, is inserted into the water-cooled cathode body and the test-piece to be analyzed is pressed against the small cathode tube, so that it closes the latter on the end facing away from the anode. Although this discharge tube insures analyzing of even test pieces of small dimension in a time-saving manner with great accuracy, whereby on account of the sharpness of the spectral lines, absence of self-reversal and the elimination of disturbing bands it is possible to determine smaller concentrations than is possible with an arc- or spark-discharge, respectively, it has still found to be of disadvantage that as a rule, for each analysis a new small cathode tube is required, that impurities in the small cathode tube determine the analysis border and that different material characteristics of the small tube influence the reproducibility of the measurements.

It is an object of the invention to construct a glow discharge tube for time-saving and expense-saving quantitative and qualitative spectral analysis, particularly of small quantities of substrate, so that auxiliary electrodes, such as counterelectrodes or small cathode tubes become superfluous, which could influence the accuracy of the analysis and the limit of the measurements.

This object is solved according to the invention in this manner, that the anode body of the glow discharge tube is provided on the cathode side with a nipple which is surrounded by the cathode body, and that a disc made of electrically conducting material is pressed against the cathode body.

In the glow discharge tube in accordance with the invention, there is produced above the disc to which the cathode potential is applied, a cathode glow light of high intensity, which is limited by the bore of the anode nipple. The continuously disintegrating (atomized) substance of the disc which is continuously bombarded with carrier gas ions produces in the cathode glow light an illumination, and in this condition permits of being spectralanalytically examined and quantitatively determined. In the same manner, a substance placed for analysis upon the disc is disintegrated; it is then likewise analyzable.

It has been found of advantage, to select the distance between the end of the nipple and the electrically conductive disc to be .05 to .5 mm., preferably .1 to .3 mm.

If the substance to be analyzed is a solid body, then the disc may consist entirely or partially of the material of the body or the solid body to be examined may be placed upon the disc.

In addition to the analysis of the solid body the glow discharge tube according to the invention, also permits of being utilized for liquid analysis and for gas analysis.

In a liquid analysis, the liquid to be analyzed is placed on a disc which is made of electrically conducting material, for example, spectral carbon, or the disc is saturated with the substance to be analyzed. After the drying of the liquid, the procedure is the same as in the solid body analysis.

For the analysis of gas-form substances by means of the glow discharge tube in accordance with the invention, the gas or gas mixture to be examined is mixed with the carrier gas. According to this method, such substances may be continuously spectralanalytically tested.

Since the local cathode glow light produced with the glow discharge tube according to the invention is very intensive, it also permits of being utilized as source of light for absorption investigations.

The new construction insures furthermore the utilizing of this glow discharge tube for mass spectroscopy.

The drawing illustrates diagrammatically a sectional view of an embodiment of a glow discharge tube in accordance with the invention.

Referring to the single figure of the drawing the glow discharge tube the housing of which consists substantially of a hollow anode body 1 provided with a downwardly extending anode nipple 2 and an annular cathode body 3 which concentrically surrounds with clearance the anode nipple 2. For electrical insulation, there is disposed between the lower face of the anode body 1 and the upper face of the cathode body a disc 4 of .2 mm. thickness made of non-conducting material such as Teflon. The disc 4 is pressed by a ring 5 consisting of copper beryllium and mounted on the nipple 2 against the upper face of the cathode body 3. The ring 5 is provided with six radial bores 5a of 1.5 mm. diameter. Screws 6 made of electrically non-conducting material for instance Novatex hold the anode- and cathode-bodies together. A circular disc 7 made of optically plane-polished quartz glass, is connected by means of an annular plate 8 and screws 8a to the upper end of the anode body and thereby closes the discharge tube on the upper spectrographical end. The test body or sample 9 to be analyzed forms the bottom of the discharge tube and is pressed by means of a tommy screw 10 tightly against the lower end of the cathode body 3. The screw 10 is mounted in a bracket 18 which may be attached to the cathode body 3.

In this discharge tube the distance between the upper face of the test-piece 9 and lower end of the anode nipple 2 amounts to .2 mm.; the distance between the cathode body 3 and the anode nipple 2 is .25 mm.; the axial length of the anode nipple 2 is 12 mm. the outer diameter of the nipple 2 is 10 mm. and the inner diameter of the nipple is 6 mm.

In order to quickly carry off the heat which is released during the discharge, the cathode body 3 is made of a good heat-conducting material, such as a copper-beryllium-alloy, and is provided with a water-cooling system 11, 11a, 11b. Four sealing rings 12, 13, 14, 15 insure a vacuum-tight closure of the discharge tube.

The carrier gas flows continuously through the gas inlet nipple 6 into the anode cavity 1a and is constantly withdrawn by an outlet nipple 17 attached to a pump so that in the cavity of the anode nipple 2 the required operating pressure is maintained; and as result of the dimensioning a predetermined pressure drop is established between this cavity and the radial bores 5a in the ring 5.

It has been found advantageous to utilize as a carrier gas an inert gas, for example argon, because with the latter, no band spectrum occurs. Preferably one operates with a gas pressure of particularly 2 to 20 torr.

As energization device comprising a source of direct current with a control range of .02 to 0.5 ampere and 3000 volts voltage is sufficient. For the current stabilization it is advisable to utilize a device with high inner resistance of about 10K ohm. The positive terminal (+) is connected to the anode body 1 and the negative terminal (−) of the direct curent source is connected to the cathode body 3, as shown or in any other suitable manner.

The glow discharge tube is secured with the anode body having a zero potential to a spectrograph, in such manner that their optical axes coincide.

With the glow discharge tube described in the foregoing by way of example, an exchange of the test-pieces is possible within a period of about 20 seconds. A gas pressure of 2 to 20 torr and a current intensity of 0.02 to 0.5 ampere are sufficient in order to keep the annealing and exposure time below 60 seconds. With the aid of a photoelectric evaluation device, the result of the analysis may already be available after about 1.5 minutes.

The accuracy of the analysis obtained is considerably better than with the conventional optical spectralanalytic methods. Thus by means of the glow discharge tube in accordance with the invention, it is possible, for example, to determine nickel in a 50% nickel-iron-alloy to .6% while by means of a hollow cathode discharge tube, the same element may be determined in the same alloy only at about 1.5%.

The advantages attained by the invention, consist particularly therein, that in a routine way, substances without great expenditure of effort may be analyzed within a very short period of time and with greater accuracy than previously spectralanalytically, without requiring an exchangeable auxiliary electrode for the discharge tube.

The invention is not limited to the embodiment described by way of example. It permits of numerous variations as regards the forming of the individual parts, the materials used as well as additional auxiliary devices. Thus for example, the sample 9 to be pressed against the cathode body with a plane or almost plane surface does not need to be disc-shaped, as shown.

What I claim is:

1. A glow discharge tube for qualitative and quantitative spectral analysis comprising a sealed housing containing an inert gas at a glow discharge pressure therein, said housing comprising a hollow anode body, an annular cathode body having one of its ends attached to, but insulated from, one end of said hollow anode body, a transparent plate closing the other end of said hollow anode body, and a test-piece closing the other end of said annular cathode body, said hollow anode body having, at its end connected with said annular cathode body, a nipple which extends into the bore of said annular cathode body with concentric clearance and terminating a short distance from said test-piece which closes said annular cathode body, said test-piece consisting of electrically conductive material, and means for pressing said test-piece tightly in engagement with said other end of said annular cathode body.

2. A glow discharge tube according to claim 1 in which said test-piece comprises a disc which consists entirely of the material to be analyzed.

3. A glow discharge tube according to claim 1, in which said test-piece comprises a disc consisting partially of the material to be analyzed.

4. A glow discharge tube according to claim 1, in which said test-piece comprises a disc on which is disposed a material to be analyzed.

5. A glow discharge tube according to claim 1, in which said test-piece comprises a disc which is saturated with the material to be analyzed.

6. A glow discharge tube according to claim 1, in which the test-piece to be analyzed is mixed with a carrier gas.

7. A glow discharge tube according to claim 1, in which the distance between the lower end of said nipple and the surface of said test-piece which is closest to the nipple amounts to .05 to 0.5 mm.

8. A glow discharge tube according to claim 1, in which the distance between the lower end of said nipple and the surface of said test-piece which is closest to the nipple amounts to .1 to .3 mm.

9. A glow discharge lamp according to claim 1, in which said closure plate comprises a disc of optically plane polished quartz glass placed against a plane end face of said hollow anode body, and means clamping said disc of quartz glass against said plane end face.

References Cited

UNITED STATES PATENTS

| | | | |
|---|---|---|---|
| 1,121,077 | 12/1914 | Dubilier | 313—237X |
| 2,200,909 | 5/1940 | Berghaus et al. | 313—237X |
| 2,974,256 | 3/1961 | Romand et al. | 313—237X |
| 3,042,833 | 7/1962 | Willis | 313—210X |
| 3,188,180 | 6/1965 | Holler. | |

FOREIGN PATENTS 967,047  8/1964  Great Britain.

JAMES W. LAWRENCE, Primary Examiner

P. C. DEMEO, Assistant Examiner

U.S. Cl. X.R.

313—231, 237; 356—86